US012799914B2

(12) United States Patent
Wöhr

(10) Patent No.: US 12,799,914 B2
(45) Date of Patent: Nov. 17, 2026

(54) METHOD FOR DIAGNOSING A WATER INJECTION SYSTEM OF AN INTERNAL COMBUSTION ENGINE OF A HYBRID ELECTRIC VEHICLE, AND HYBRID ELECTRIC VEHICLE

(71) Applicant: Dr. Ing. h.c. F. Porsche Aktiengesellschaft, Stuttgart (DE)

(72) Inventor: Holger Wöhr, Weissach (DE)

(73) Assignee: Dr. Ing. h.c. F. Porsche Aktiengesellschaft

( * ) Notice: Subject to any disclaimer, the term of this patent is extended or adjusted under 35 U.S.C. 154(b) by 0 days.

(21) Appl. No.: 19/302,137

(22) Filed: Aug. 18, 2025

(65) Prior Publication Data

US 2026/0049586 A1 Feb. 19, 2026

(30) Foreign Application Priority Data

Aug. 19, 2024 (DE) ......................... 102024123563.2

(51) Int. Cl.
*F02M 25/025* (2006.01)
*F02D 41/22* (2006.01)
(Continued)

(52) U.S. Cl.
CPC ......... *F02M 25/0227* (2013.01); *F02D 41/22* (2013.01); *F02M 25/0221* (2013.01);
(Continued)

(58) Field of Classification Search
CPC ........... F02M 25/0227; F02M 25/0221; F02M 25/03; F02M 25/022; F02M 25/08; F02M 25/025; F02D 41/22; F02D 2200/10
See application file for complete search history.

(56) References Cited

U.S. PATENT DOCUMENTS

2018/0022339 A1 1/2018 Leone et al.
2018/0066609 A1* 3/2018 Miller .................. F02B 77/085
(Continued)

FOREIGN PATENT DOCUMENTS

DE 102017116332 A1 1/2018
DE 102023106197 B3 5/2024

OTHER PUBLICATIONS

German Examination Report issued Jun. 24, 2025, by the German Patent and Trademark Office in corresponding German Patent Application No. 10 2024 123 563.2 with an English translation. (6 pages).

*Primary Examiner* — Jacob M Amick
(74) *Attorney, Agent, or Firm* — Buchanan Ingersoll & Rooney PC

(57) ABSTRACT

A method for diagnosing a water injection system of an internal combustion engine of a hybrid electric vehicle. The method includes providing water having a defined test water pressure, closing a shut-off valve in the case of water supplied at the defined test water pressure, injecting a defined target water quantity into a suction tube of the engine via the injection nozzle, and determining a residual water pressure remaining in a region of the water line located between the injection nozzle and the shut-off valve after the injection. Prior to the injection, a current engine load of the engine is determined. The determined current engine load is compared to a load threshold. The engine is exposed to an additional load by the operation of an electrical traction motor of the vehicle in generator mode when the determined current engine load is less than the load threshold.

6 Claims, 1 Drawing Sheet

(51) Int. Cl.
*F02M 25/022* (2006.01)
*F02M 25/028* (2006.01)
*F02M 25/03* (2006.01)

(52) U.S. Cl.
CPC ........ *F02M 25/025* (2013.01); *F02M 25/028* (2013.01); *F02M 25/03* (2013.01); *F02D 2200/10* (2013.01)

(56) References Cited

U.S. PATENT DOCUMENTS

| | | | | |
|---|---|---|---|---|
| 2019/0120176 | A1* | 4/2019 | Park | F02M 25/0227 |
| 2019/0234299 | A1* | 8/2019 | Jost | F02M 25/0221 |

* cited by examiner

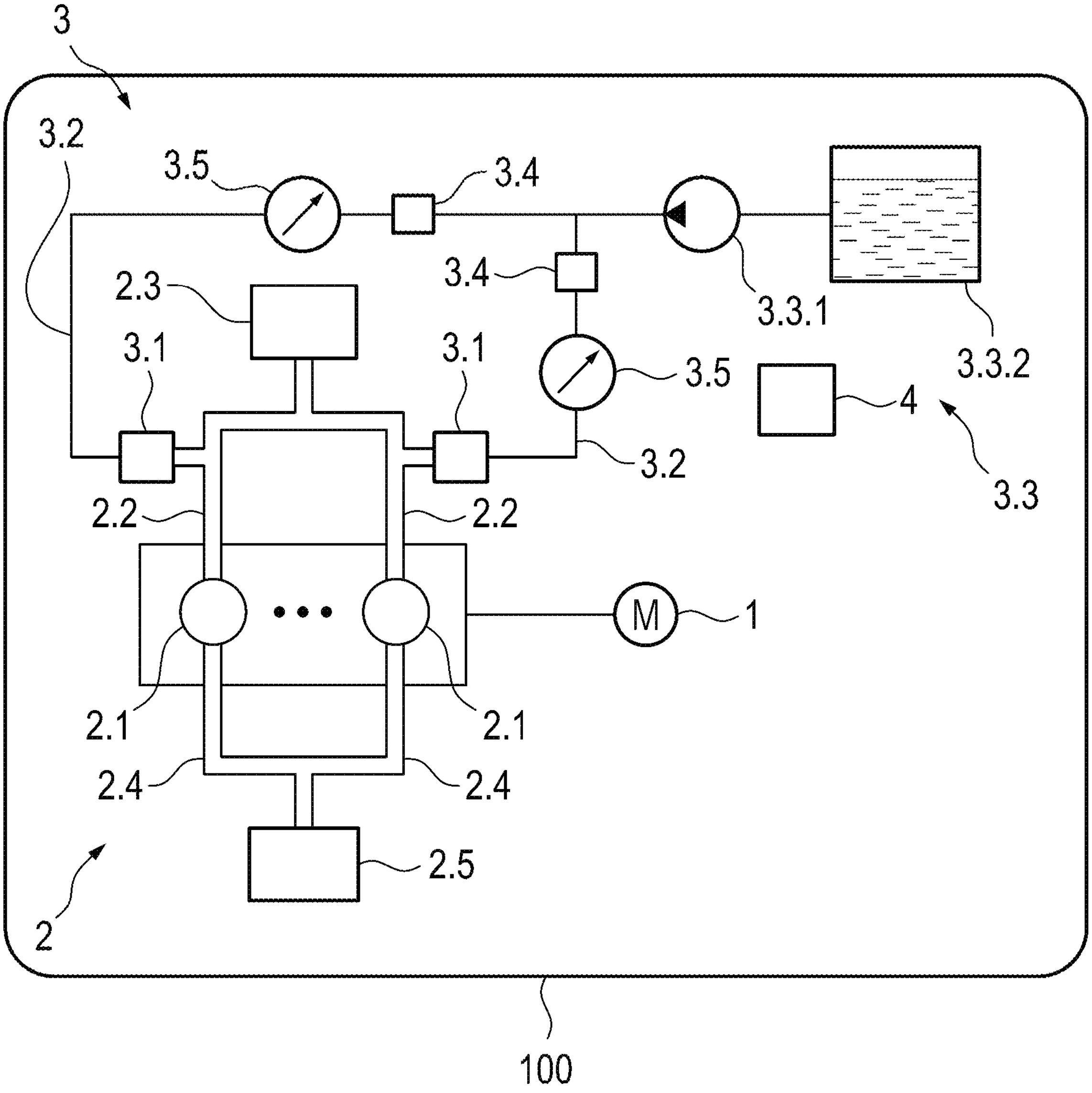
3
3.2
3.5
3.4
3.4
2.3
3.1
3.1
3.5
3.3.1
3.3.2
4
3.2
3.3
2.2
2.2
M
1
2.1
2.1
2.4
2.4
2.5
2
100

METHOD FOR DIAGNOSING A WATER INJECTION SYSTEM OF AN INTERNAL COMBUSTION ENGINE OF A HYBRID ELECTRIC VEHICLE, AND HYBRID ELECTRIC VEHICLE

CROSS REFERENCE TO RELATED APPLICATION

This application claims priority to German Patent Application No. 10 2024 123 563.2, filed Aug. 19, 2024, the content of such application being incorporated by reference herein in its entirety.

FIELD OF THE INVENTION

The present invention relates to a method for diagnosing a water injection system of an internal combustion engine of a hybrid electric vehicle, as well as to a hybrid electric vehicle.

BACKGROUND OF THE INVENTION

A method for diagnosing a water injection system of an internal combustion engine is known from DE 10 2023 106 197 B3, which is incorporated by reference herein.

SUMMARY OF THE INVENTION

The present invention addresses the problem of enabling a reliable diagnosis of a water injection system of an internal combustion engine of a hybrid electric vehicle.

With the method according to aspects of the invention for diagnosing a water injection system of an internal combustion engine of a hybrid electric vehicle, it is checked whether an injection nozzle of the water injection system configured so as to inject water into a suction tube of the internal combustion engine allows a desired water flow rate, or whether it is dirty or clogged.

For this purpose, in the method according to aspects of the invention, water is provided at a defined test water pressure in a region of a water line located between the injection nozzle and a shut-off valve by means of a water supply device. The water supply device typically comprises a water tank and a pump for conveying water from the water tank via water lines to the injection nozzle. The water supply device is configured in a manner known per se so as to supply water to the injection nozzle at a defined water pressure.

When water is provided at the desired defined test water pressure in the region of the water line located between the injection nozzle and a shut-off valve, the shut-off valve is closed, and thereby a defined volume of water having the test water pressure is trapped in the region of the water line located between the injection nozzle and the shut-off valve.

When the shut-off valve is closed, a defined target water quantity is injected into a suction tube of the internal combustion engine via the injection nozzle, whereby the volume of water and consequently the water pressure in the region of the water line located between the injection nozzle and the shut-off valve is decreased.

After the injection, the residual water pressure remaining in the region of the water line located between the injection nozzle and the shut-off valve is determined and compared to a reference water pressure that would be expected for reducing the trapped water volume by the target water quantity. Too much residual water pressure means that too little water has been removed from the trapped water volume and is therefore an indicator of a dirty or clogged injection nozzle.

Because injecting water into the suction tube influences the combustion of the internal combustion engine, specifically delayed, injecting water at a relatively low engine load can cause misfires.

According to aspects of the present invention, therefore, prior to injecting the water into the suction tube, a current engine load of the internal combustion engine is determined in a manner known per se, and the determined current engine load is compared to a load threshold.

If the determined current engine load is less than the load threshold, then an electric traction motor of the hybrid electric vehicle is operated in a generator mode, in which an electric traction motor rotor is driven by the internal combustion engine in order to apply an additional load to the internal combustion engine. The electric traction motor is actuated such that the total load resulting from the sum of the determined current engine load and the additional load is greater than or equal to, preferably approximately equal to, the load threshold.

The method according to aspects of the invention allows for a diagnosis of the water injection system, even at relatively low current engine load, without taking the risk of misfires, and thus for a continuous and consequently particularly reliable diagnosis of the water injection system of an internal combustion engine of a hybrid electric vehicle.

The water injection system of internal combustion engines having a plurality of cylinders typically comprises a plurality of injection nozzles, specifically a number of injection nozzles corresponding to the number of cylinders, each configured so as to inject water into the suction tube of one of the cylinders. Preferably, in this case, the method described above is carried out one after the other for each of the plurality of injection nozzles in order to check each injection nozzle individually. Thus, for each injection nozzle in the respective injection nozzle region of the water line, the test water pressure is provided, a trapped water volume is generated upstream of the respective injection nozzle by closing a shut-off valve, the target water quantity is injected into the respective suction tube via the respective injection nozzle, and after the injection the respective residual water pressure in the respective trapped water volume is determined. Preferably, the residual water pressures determined for the individual injection nozzles are not only compared to the reference water pressure but also to one another. This allows for a reliable diagnosis of a water injection system having a plurality of injection nozzles. It is conceivable here that all injection nozzles are connected to a single shut-off valve and that an individual shut-off valve is present for each injection nozzle.

Preferably, in order to inject the defined target water quantity, a plurality of individual partial injections are carried out with the respective injection nozzle, in which a partial target water quantity is injected into the suction pipe via the respective injection nozzle, wherein the sum of all partial target water quantities is equal to the defined target water quantity.

Particularly preferably, during each partial injection, an identical partial target water quantity is injected into the suction tube via the respective injection nozzle.

In order to avoid the occurrence of a relatively low engine load as far as possible during the execution of the diagnosis of the water injection system, during the execution of the method according to aspects of the invention, an overrun fuel cut-off function of the hybrid electric vehicle which is designed in the manner known per se is preferably blocked, i.e., an overrun fuel cut-off of the internal combustion engine is prevented.

The hybrid electric vehicle according to aspects of the present invention comprises an electrical traction motor, which can optionally be operated in a manner known per se in an engine mode or in a generator mode. In engine mode, electrical energy is supplied to the electrical traction motor, typically from a high-volt battery, also referred to as a traction battery, whereby a motor rotor of the electrical traction motor is electromagnetically driven. In generator mode of the electrical traction motor, on the other hand, the motor rotor of the electrical traction motor is mechanically driven, for example, by the internal combustion engine or by the wheels of the hybrid electric vehicle, whereby electrical energy is generated in the electrical traction motor.

The hybrid electric vehicle according to aspects of the present invention further comprises an internal combustion engine having a water injection system. The water injection system comprises at least one injection nozzle configured so as to inject water into a suction tube of the internal combustion engine as described above. The water injection system further comprises at least one shut-off valve arranged in a water line leading to the injection nozzle and configured in a manner known per se so as to selectively shut off (i.e., prevent) or release (i.e., allow) a water flow through the water line. The water injection system further comprises a water supply configured as described above for supplying water at a defined water pressure to the at least one injection nozzle.

The hybrid electric vehicle according to aspects of the present invention further comprises a diagnostic unit configured so as to carry out a method according to aspects of the present invention for diagnosing the water injection system of the internal combustion engine of the hybrid electric vehicle. For example, the diagnostic unit can be realized by suitable programming of a control unit of the hybrid electric vehicle. However, it is generally also conceivable that the diagnostic unit is realized with its own hardware component.

By carrying out the method according to aspects of the invention, the diagnostic unit enables a reliable diagnosis of the water injection system of the internal combustion engine of the hybrid electric vehicle for the reasons described above.

BRIEF DESCRIPTION OF THE DRAWING FIGURE

An exemplary embodiment of the present invention is described below on the basis of the attached FIG. 1, which shows a schematic diagram of a hybrid electric vehicle according to aspects of the invention.

DETAILED DESCRIPTION OF THE INVENTION

FIG. 1 shows a hybrid electric vehicle 100 according to aspects of the present invention comprising an electrical traction motor 1, an internal combustion engine 2 having a water injection system 3, and a diagnostic unit 4. The diagnostic unit 4 may comprise or form part of a computer having a processor, memory containing software instructions and a controller, for example.

The internal combustion engine 2 comprises a plurality of cylinders 2.1, each connected to an air supply system 2.3 via a suction tube 2.2 and each connected to an exhaust system 2.5 via an exhaust pipe 2.4.

The water injection system 3 comprises a number of injection nozzles 3.1 corresponding to the number of cylinders 2.1, each arranged on the suction tube 2.2 of one of the cylinders 2.1, and each being configured so as to inject water supplied via a water line 3.2 into the respective suction tube 2.2.

The water injection system 3 comprises a water supply device 3.3 having a pump 3.3.1 and a water tank 3.3.2, wherein the pump 3.3.1 is configured so as to supply water from the water tank 3.3.2 to the injection nozzles 3.1 via the water lines 3.2 at a defined water pressure.

In the water lines 3.2 leading to the individual injection nozzles 3.1, a shut-off valve 3.4 and a pressure sensor 3.5 are respectively arranged, wherein the pressure sensor 3.5 is respectively arranged downstream of the shut-off valve 3.4.

The diagnostic unit 4 is configured so as to actuate the pump 3.3.1 such that water is supplied at a defined test water pressure in the water lines 3.2, respectively.

The diagnostic unit 4 is further configured so as to close the shut-off valves 3.4 while water having the defined test water pressure is provided in the water lines 3.2, such that a water volume having the defined test water pressure is trapped in a region of the water lines 3.2 located between the respective injection nozzle 3.1 and the respective shut-off valve 3.4.

The diagnostic unit 4 is further configured so as to actuate each of the injection nozzles 3.1 individually such that a defined target water quantity is injected into the respective suction pipe 2.2 via the respective injection nozzle 3.1.

The diagnostic unit 4 is in particular configured so as to carry out a plurality of individual partial injections in order to inject the defined target water quantity via the respective injection nozzle 3.1, in which an identical partial target water quantity is injected into the respective suction pipe 2.2 via the respective injection nozzle 3.1.

The diagnostic unit 4 is further configured so as to determine a residual water pressure remaining in the respective injection nozzle 3.1 and the respective shut-off valve 3.4 of the respective water line 3.2 after the injection by means of the respective pressure sensor 3.5.

The diagnostic unit 4 is further configured so as to compare the residual water pressures thusly determined for the individual injection nozzles 3.1 to one another and to a reference water pressure.

The diagnostic unit 4 is configured so as to determine a current engine load of the internal combustion engine 2 in a manner known per se prior to the injection, to compare the determined current engine load to a load threshold, and to apply an additional load to the internal combustion engine 2 by operation of the electrical traction motor 1 in a generator mode when the determined current engine load is less than the load threshold.

The diagnostic unit 4 is further configured so as to block overrun fuel cut-off functions of the hybrid electric vehicle 100 designed in a manner known per se during the execution of the steps described above.

| List of reference numerals | |
|---|---|
| 100 | Hybrid electric vehicle |
| 1 | Electrical traction motor |
| 2 | Internal combustion engine |
| 2.1 | Cylinder |
| 2.2 | Suction tubes |
| 2.3 | Air supply system |
| 2.4 | Exhaust pipes |
| 2.5 | Exhaust system |

-continued

| List of reference numerals | |
|---|---|
| 3 | Water injection system |
| 3.1 | Injection nozzles |
| 3.2 | Water lines |
| 3.3 | Water supply device |
| 3.3.1 | Pump |
| 3.3.2 | Water tank |
| 3.4 | Shut-off valves |
| 3.5 | Pressure sensors |
| 4 | Diagnostic unit |

What is claimed is:

1. A method for diagnosing a water injection system of an internal combustion engine of a hybrid electric vehicle, said method comprising the steps of:

providing water having a defined test water pressure in a region of a water line located between an injection nozzle and a shut-off valve using a water supply device, closing the shut-off valve in a case of water supplied at the defined test water pressure, injecting a defined target water quantity into a suction tube of the internal combustion engine via the injection nozzle, determining a residual water pressure remaining in the region of the water line located between the injection nozzle and the shut-off valve after the injection, wherein prior to the injecting step, the method further comprises the steps of determining a current engine load of the internal combustion engine, comparing the determined current engine load to a load threshold, and, when the determined current engine load is less than the load threshold, exposing the internal combustion engine to an additional load by the operation of an electrical traction motor of the hybrid electric vehicle in generator mode.

2. The method according to claim 1, wherein the water injection system comprises a plurality of injection nozzles, and wherein the method is carried out individually with each of the plurality of injection nozzles, one after the other.

3. The method according to claim 1, wherein a plurality of individual partial injections are carried out for injecting the defined target water quantity, in which a partial target water quantity is injected into the suction tube via the injection nozzle.

4. The method according to claim 3, wherein, with each partial injection, an identical partial target water quantity is injected into the suction tube via the injection nozzle.

5. The method according to claim 1, wherein, during the execution of the method, an overrun fuel cut-off function of the hybrid electric vehicle is blocked.

6. A hybrid electric vehicle comprising:

an electrical traction motor, an internal combustion engine having a water injection system and a diagnostic unit, wherein the water injection system comprises: (i) at least one injection nozzle which is configured to inject water into a suction tube of the internal combustion engine, (ii) a shut-off valve arranged in a water line leading to the injection nozzle, and (iii) a water supply device for supplying water having a defined water pressure to the at least one injection nozzle, and wherein the diagnostic unit is configured to perform the following steps:

provide water having the defined test water pressure in a region of the water line located between the injection nozzle and the shut-off valve using the water supply device, close the shut-off valve in a case of water supplied at the defined test water pressure, inject a defined target water quantity into a suction tube of the internal combustion engine via the injection nozzle, and determine a residual water pressure remaining in the region of the water line located between the injection nozzle and the shut-off valve after the injection step, wherein prior to the injection step, the method comprises the steps of determining a current engine load of the internal combustion engine, comparing the determined current engine load to a load threshold, and, when the determined current engine load is less than the load threshold, exposing the internal combustion engine to an additional load by the operation of an electrical traction motor of the hybrid electric vehicle in generator mode.

* * * * *